Figure 1:
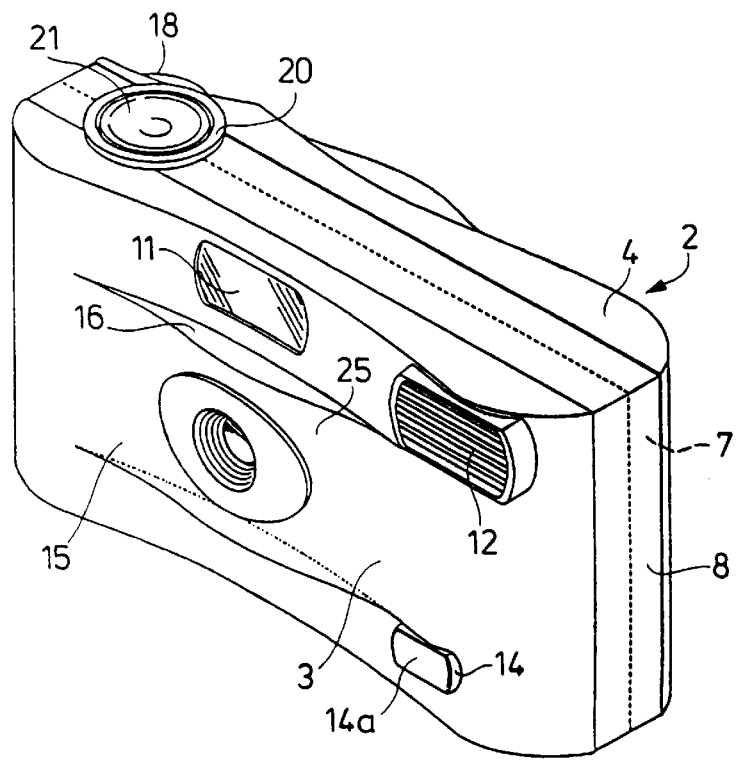

United States Patent [19]
Schröder et al.

[11] Patent Number: 5,988,893
[45] Date of Patent: Nov. 23, 1999

[54] CAMERA WITH FILM CASSETTE AND SEALING MEMBER FOR CLOSING CASSETTE OPENING IN LIGHTPROOF MANNER

[75] Inventors: Rolf Schröder, Zorneding; Paul Kopf, Unterhaching, both of Germany

[73] Assignee: AGFA Gevaert Aktiengesellschaft, Germany

[21] Appl. No.: 09/244,717

[22] Filed: Feb. 4, 1999

Related U.S. Application Data

[62] Division of application No. 08/800,033, Feb. 13, 1997.

[30] Foreign Application Priority Data

Feb. 21, 1996 [DE] Germany .......................... 196 06 387
Apr. 15, 1996 [DE] Germany .......................... 196 14 796

[51] Int. Cl.[6] .............................. G03B 1/00; G03B 17/26
[52] U.S. Cl. ......................... 396/411; 396/284; 396/513; 396/538
[58] Field of Search ................. 396/6, 284, 411, 396/512, 513, 515, 516, 538

[56] References Cited

U.S. PATENT DOCUMENTS

| | | | |
|---|---|---|---|
| 5,231,438 | 7/1993 | Smart | 396/522 |
| 5,629,750 | 5/1997 | Smart et al. | 396/538 |
| 5,717,971 | 2/1998 | Stiehler et al. | 396/513 |
| 5,748,990 | 5/1998 | Smart et al. | 396/6 |

*Primary Examiner*—Eddie C. Lee
*Attorney, Agent, or Firm*—Connolly Bove Lodge & Hutz

[57] ABSTRACT

A camera having a camera housing (1, 2), a film cassette chamber (38) arranged in the camera housing for receiving a film cassette (25) for strip-like, photosensitive film (26), a film opening (31) of the film cassette (25) being closable in a lightproof manner by a sealing member (33), which can be adjusted between an open position and a closed position, furthermore a drive device displaceably arranged in the camera housing for adjusting the sealing member (33) of the film cassette (25) inserted in the film cassette chamber (38) from the open position into the closed position, a film transportation device and a locking device arranged in the camera housing for locking the film transportation device when the sealing member (33) of the film cassette (25) is in the closed position.

6 Claims, 13 Drawing Sheets

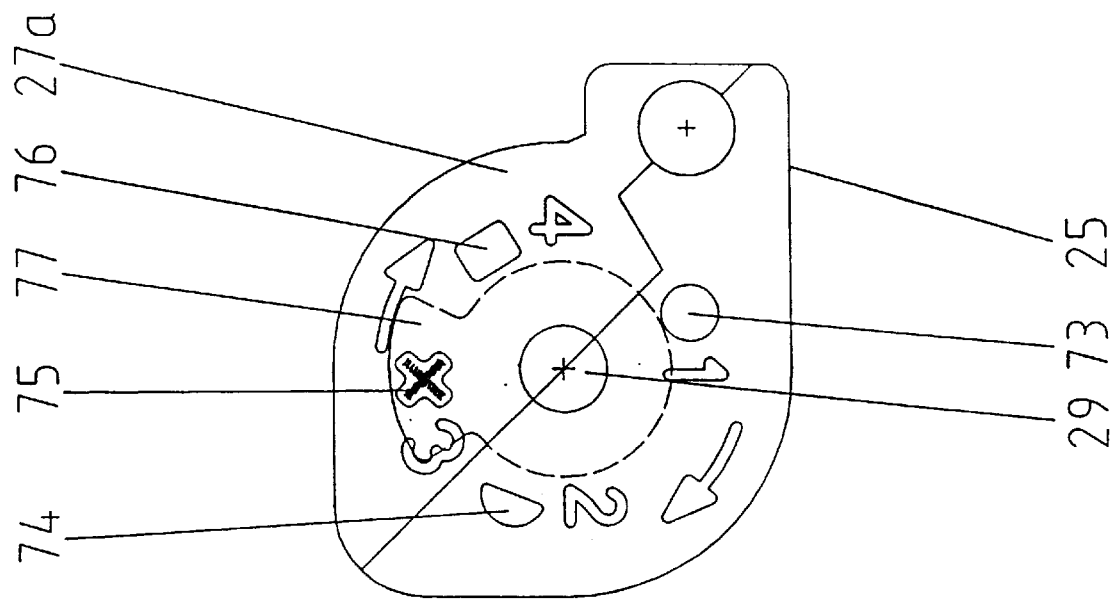

CAMERA WITH FILM CASSETTE AND SEALING MEMBER FOR CLOSING CASSETTE OPENING IN LIGHTPROOF MANNER

CROSS-REFERENCE TO RELATED APPLICATIONS

This application is a divisional of application Ser. No. 08/800,033 filed Feb. 13, 1997, and Continuing Patent Application filed Oct. 30, 1998.

The invention relates to a camera according to the preamble of claim 1.

The invention preferably relates to a camera for the use of film and film cassettes of a system which has become known to the public as an "Advanced Photo System". Films and film cassettes of this system are referred to in the following as APS films or APS film cassettes for short.

APS film cassettes are essentially of a similar design to film cassettes of the conventional 135 system, but differ therefrom not only in the external shape and dimensioning, but in particular in that the lightproof seal of the film mouth of the cassette is not effected by plush inlays but by an elongate sealing member, which is rotatably arranged in the region of the film mouth and is adjustable between an open position and a closed position by means of a drive in the camera. In the open position, the sealing member allows the film to pass through the film mouth, whilst in the closed position of the sealing member the film is fully wound into the cassette and the interior of the cassette is externally sealed in a lightproof manner against the surrounding light.

In this respect, it is necessary to ensure before removing a film cassette from a camera in which the cassette is installed that the film is fully wound into the cassette and that the sealing member of this cassette is in the closed position, since otherwise the surrounding light penetrates the open film mouth into the interior of the film cassette, so that the film wound within the cassette is subjected to undesirable exposure, thereby damaging any earlier frame-by-frame exposure of the film.

It is known from U.S. Pat. No. 5,231,438, in a camera for a film cassette of the APS type or for a film cassette of a similar design, to lock a housing lid—which closes a film cassette chamber of the camera—against opening, so long as a film which is located in the camera has not been fully wound into the film cassette which is accommodated in the film cassette chamber and therefore so long as the sealing member of the film cassette cannot yet adopt the closed position as a result of the fact that film is still located in the film mouth of the film cassette. However, a locking mechanism of this type is relatively complicated and therefore requires a considerable increase in costs for the manufacture of the camera. Furthermore, it is necessary to ensure that the locking mechanism can be overridden by external intervention in the event of operational disturbances in the camera.

It is known from U.S. Pat. No. 5,452,036, in a camera for a film cassette of like or similar construction, to make the unlocking of a housing lid closing the film cassette chamber of the camera dependent upon the transfer of a sealing member of the film cassette into the closed position, so that the film mouth of the film cassette inserted in the camera is transferred into the closed position before the housing lid can be fully unlocked and opened. In this manner, surrounding light is prevented from entering the film cassette chamber of the camera. This solution is also relatively complicated and requires a high degree of manufacturing precision, which again results in relatively high manufacturing costs.

Furthermore, it is known from DE-A-3 736 377 to prevent accidental opening of a lid of a miniature camera so long as a film installed in the camera is still located in the region of the aperture and is therefore not fully wound into a film cassette. To this end, a sensor is provided, for example, which is preferably constructed as a tilting lever with a sensor roller resting against the film. In the absence of film, the sensor roller drops at the sensing site into a recess in the housing, so that the tilting lever executes a control movement which can be used for unlocking the lid. An optical or acoustic signal transmission can also be associated with this movement. The locking and signalling device can also be coupled with a film rewind device of the camera or cassette.

It is the object of the invention to provide a camera of the initially-mentioned type, in which an undesirable actuation of the film transportation device is prevented after the closure of the sealing member of the film cassette.

It is a further object of the invention to provide a camera of the initially-mentioned type, in which the operating state of the film cassette inserted in the camera can be automatically indicated.

Furthermore, it is the object of the invention to provide a camera of the initially-mentioned type, in which it can be easily recognised whether a housing lid of the camera can be opened in order to remove a film cassette contained therein, without the danger of undesirable exposure of the film by the penetration of surrounding light. It is a further object of the invention to ensure on the one hand to ensure ease of film transportation without the danger of damage to the transported film during the process of photographic recording and on the other hand to allow for easy closure of the film cassette once the last picture has been taken.

These objects are attained according to the invention by the features of claims 1, 8, 11 and 17 respectively.

Further developments of the invention are contained in the subclaims which are dependent on these claims.

Preferred embodiments of the invention are described in further detail in the following with the aid of the drawings.

Figure 2:
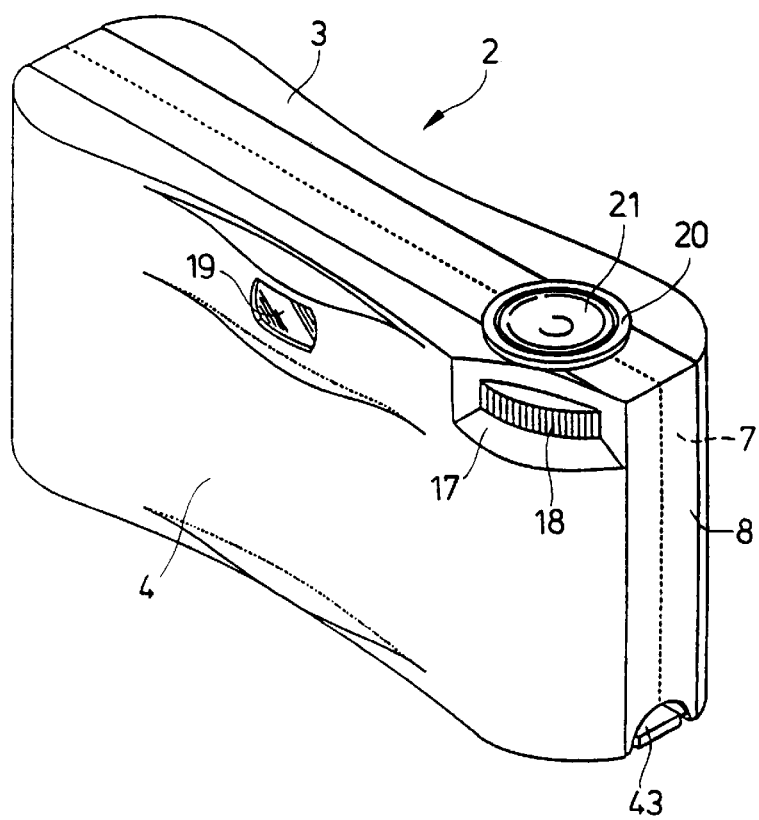
Figure 3:
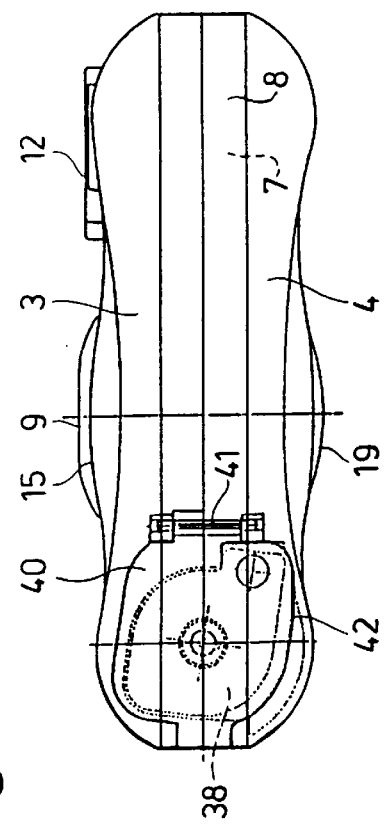
Figure 4:
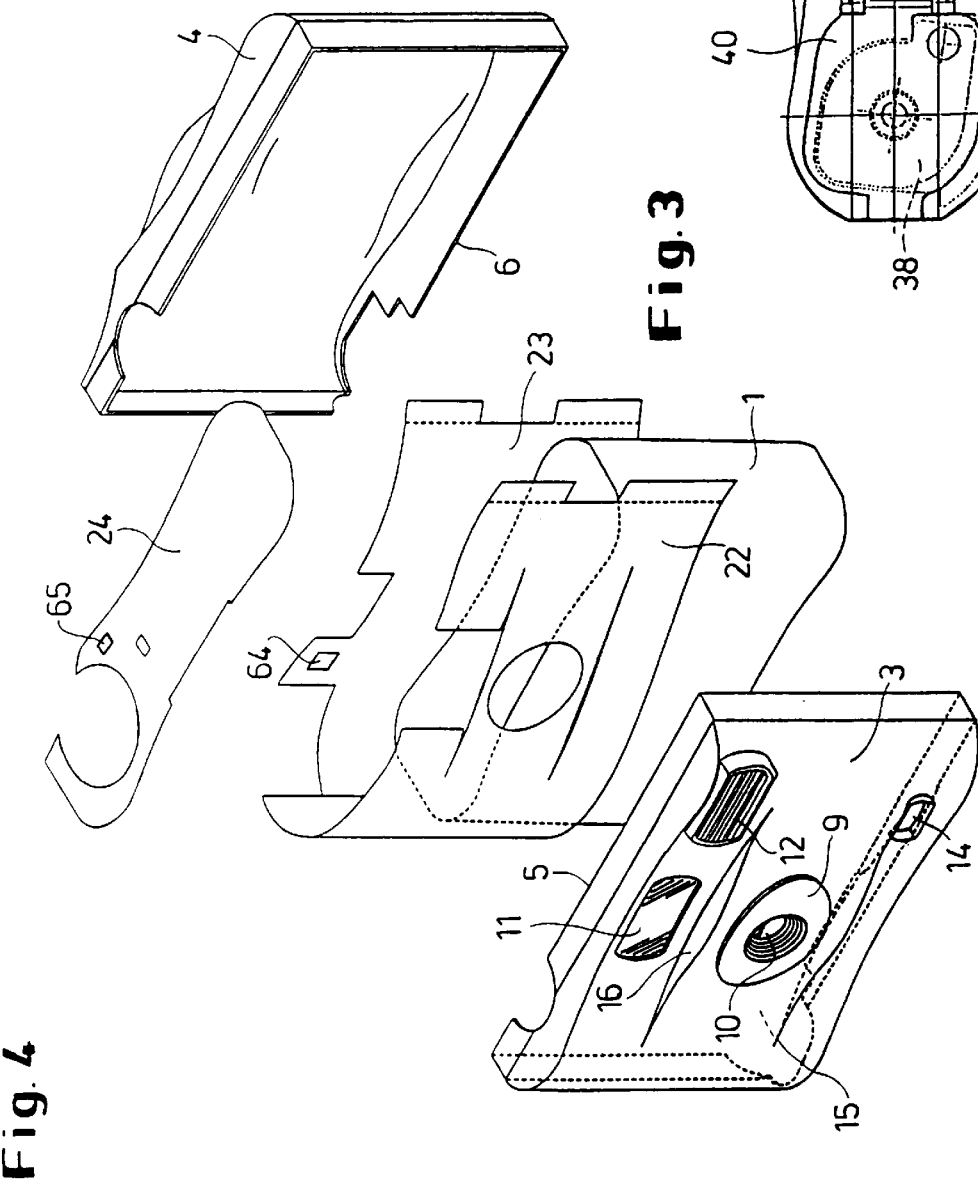
Figure 5:
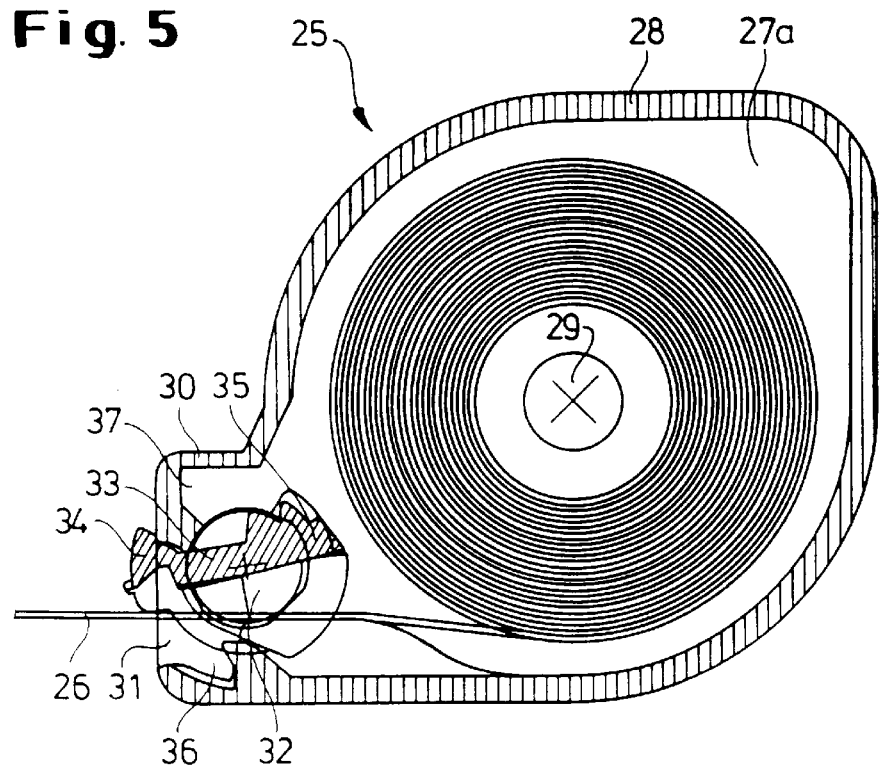
Figure 6:
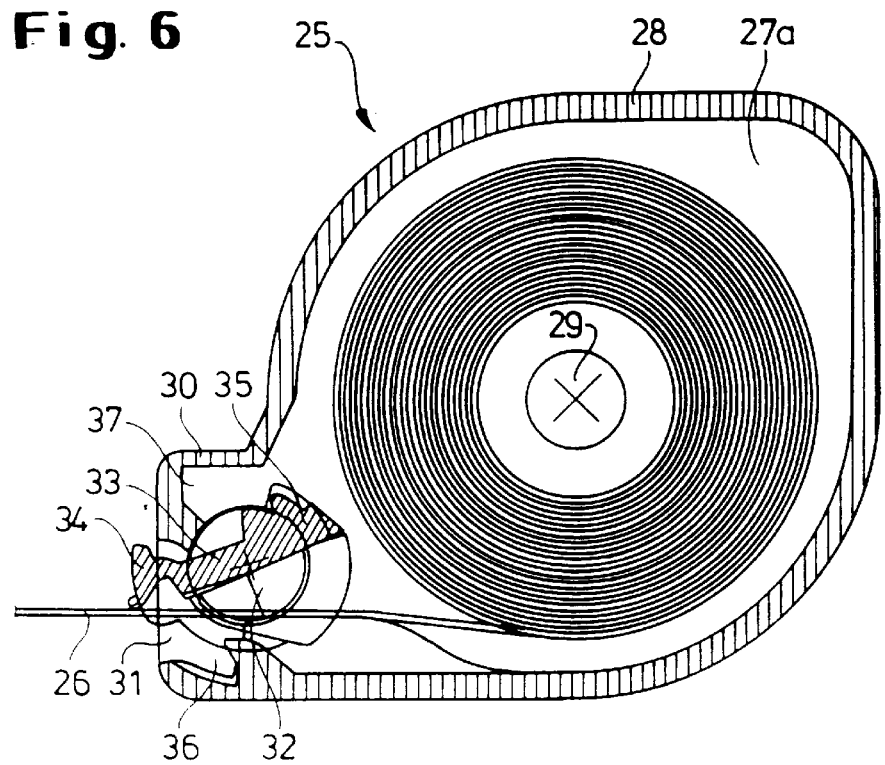
Figure 7:
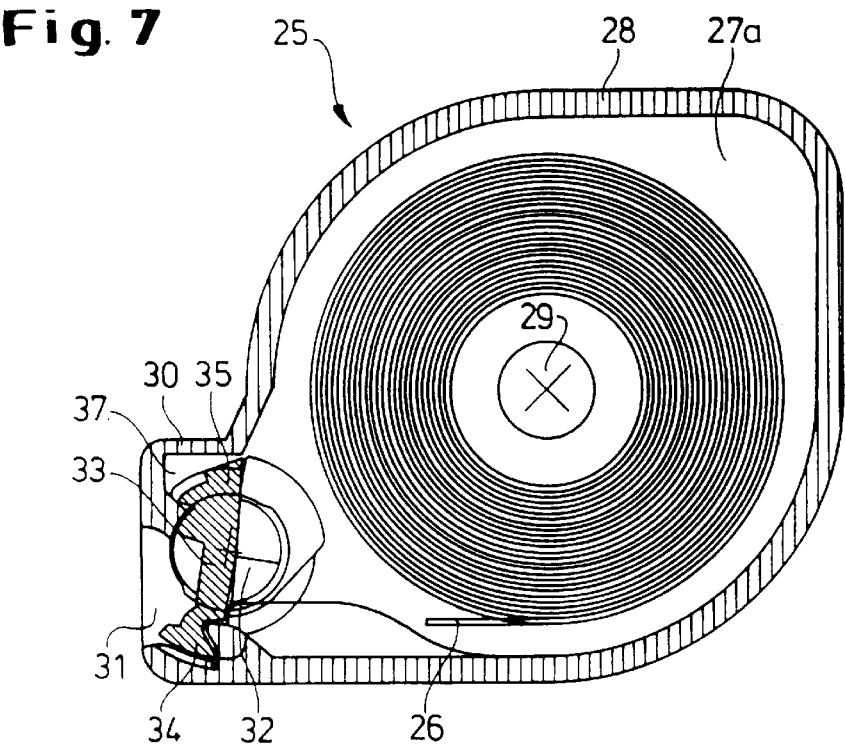
Figure 8:
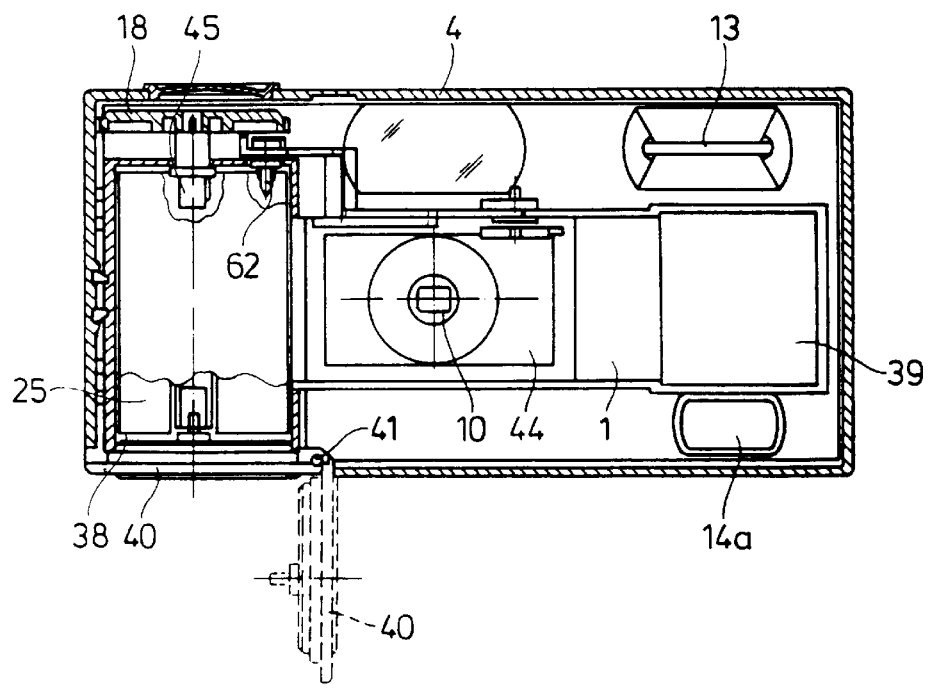
Figure 9:
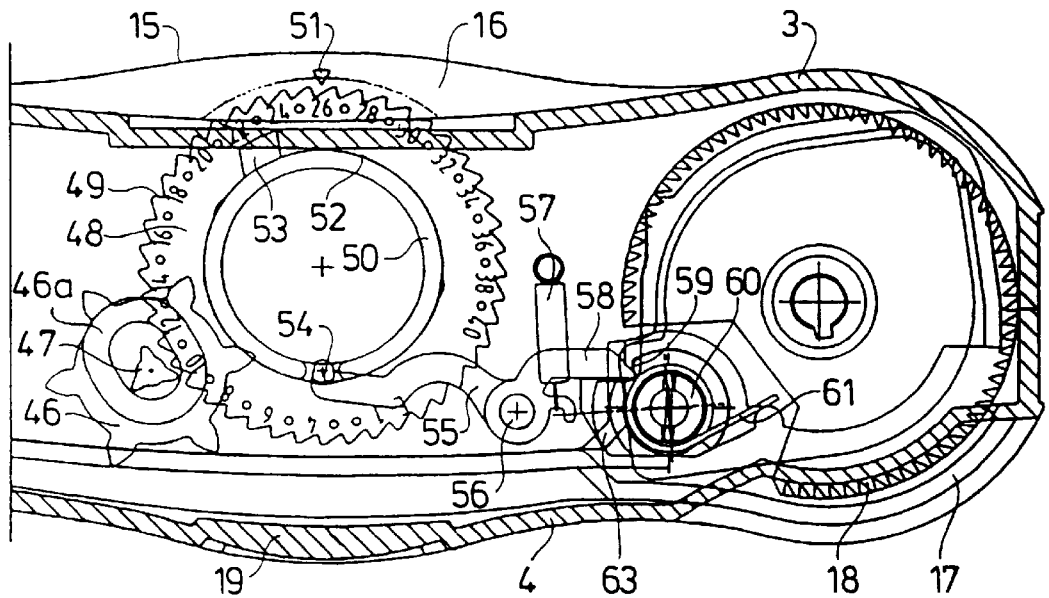
Figure 10:
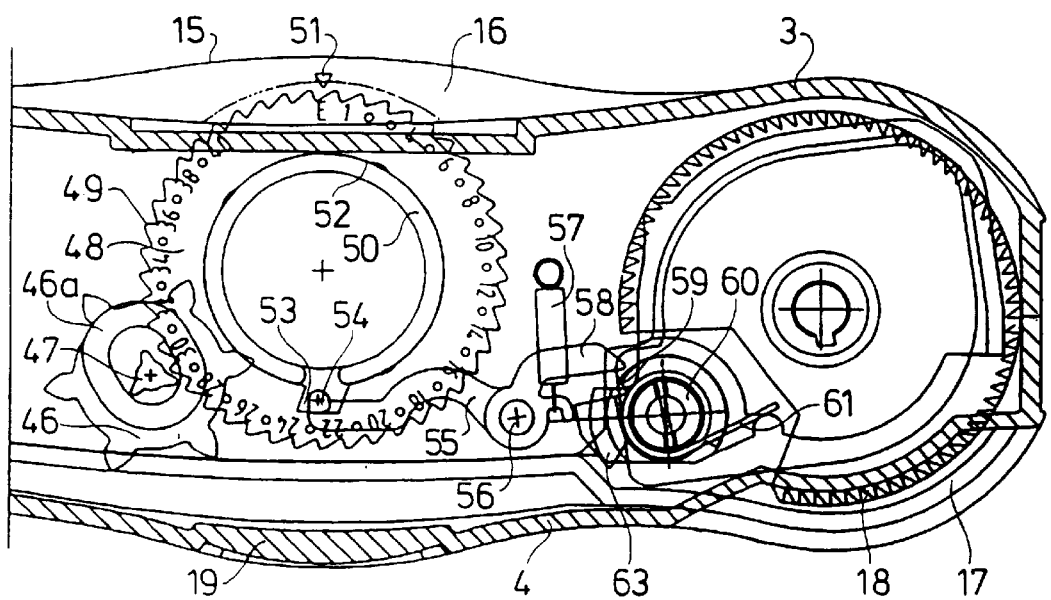
Figure 11:
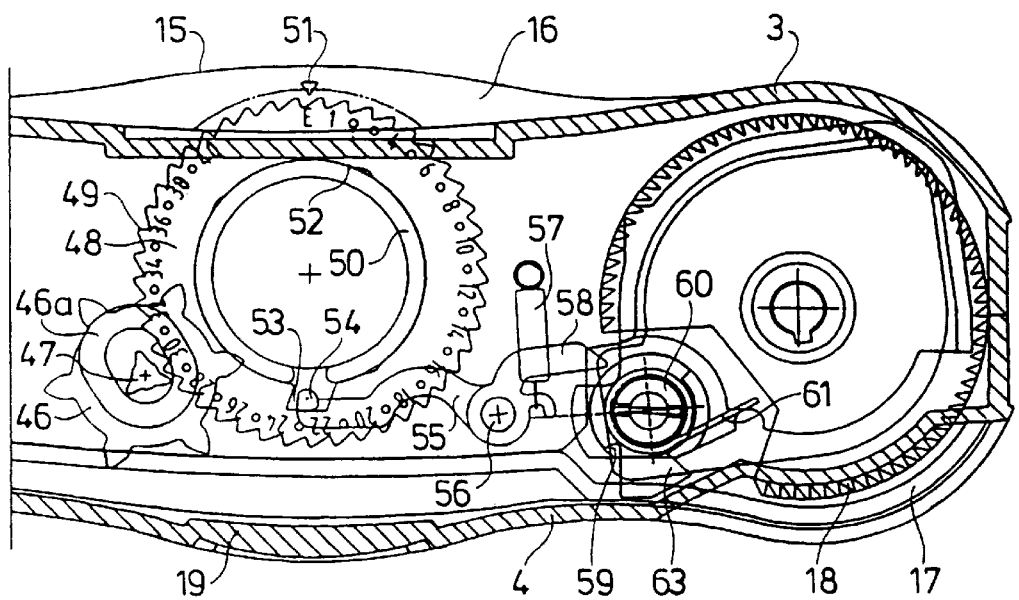
Figure 12:
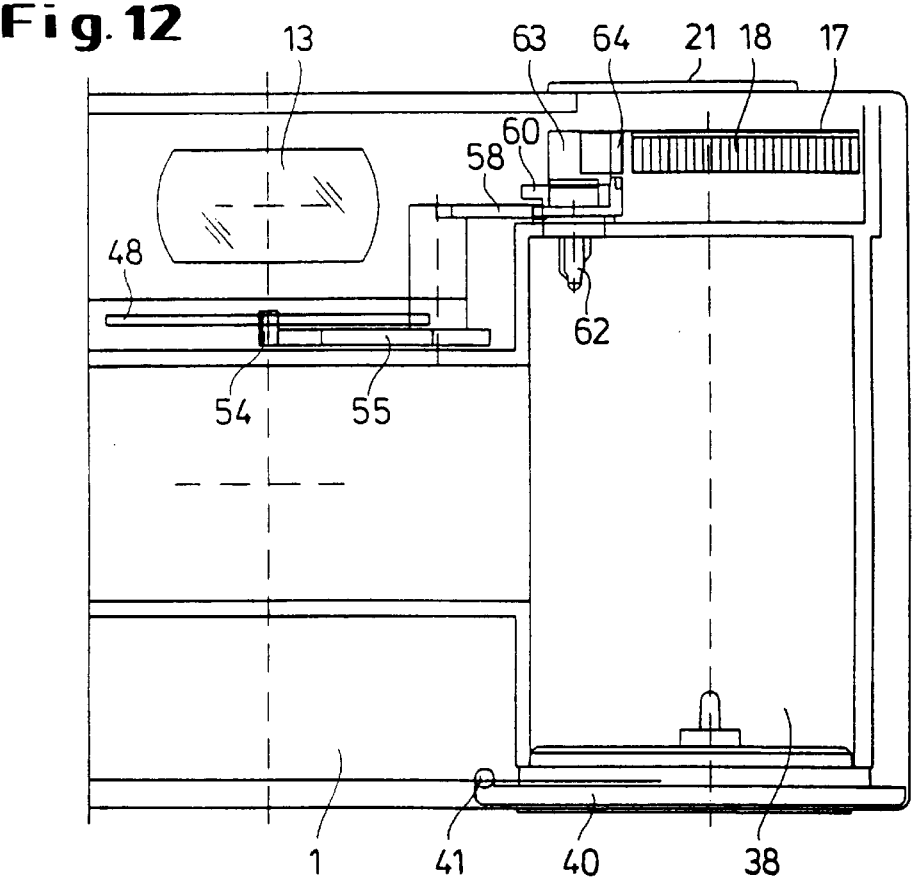
Figure 13:
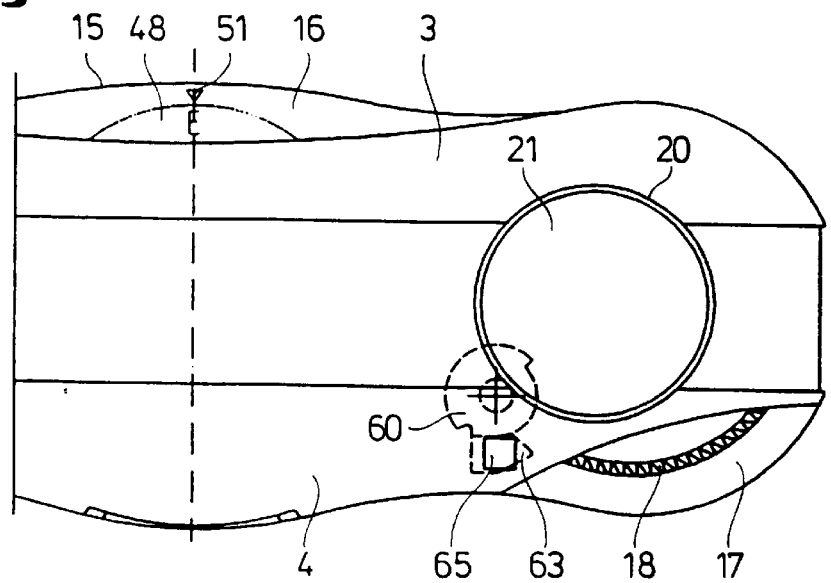

In the schematic drawings:

FIG. 1 is a front perspective view showing the external appearance of a camera according to the invention suitable for the use of an APS film cassette, FIG. 2 is a rear perspective view showing the external appearance of a camera according to FIG. 1, FIG. 3 is a view from below showing the external appearance of the camera according to FIGS. 1 and 2, FIG. 4 is an exploded view of the camera according to FIG. 1 with the front and rear housing shells and a schematically illustrated core module arranged between said housing shells, FIG. 5 is a section through an APS film cassette with a sealing member in the open position, FIG. 6 shows the film cassette according to FIG. 5 with the sealing member in an intermediate position, FIG. 7 shows the film cassette according to FIG. 5 with the sealing member in its closed position, FIG. 8 shows the internal structure of the camera according to FIGS. 1 to 4 with a first embodiment, shown in further detail, of the core module of this camera in a front view with the front housing shell removed, FIG. 9 is a view from above of the core module of the camera shown in FIG. 8 with a shift gearing in a first operating position, FIG. 10 shows the subject matter of FIG. 9 with the shift gearing in a second operating position, FIG. 11 shows the subject matter of FIG. 9 with the shift gearing in a third operating position, FIG. 12 is a view from behind showing part of the core module of FIGS. 8 to 11 and part of the external housing of the camera, and FIG. 13 is a view from above of the subject matter of FIG. 12.

Figure 14:
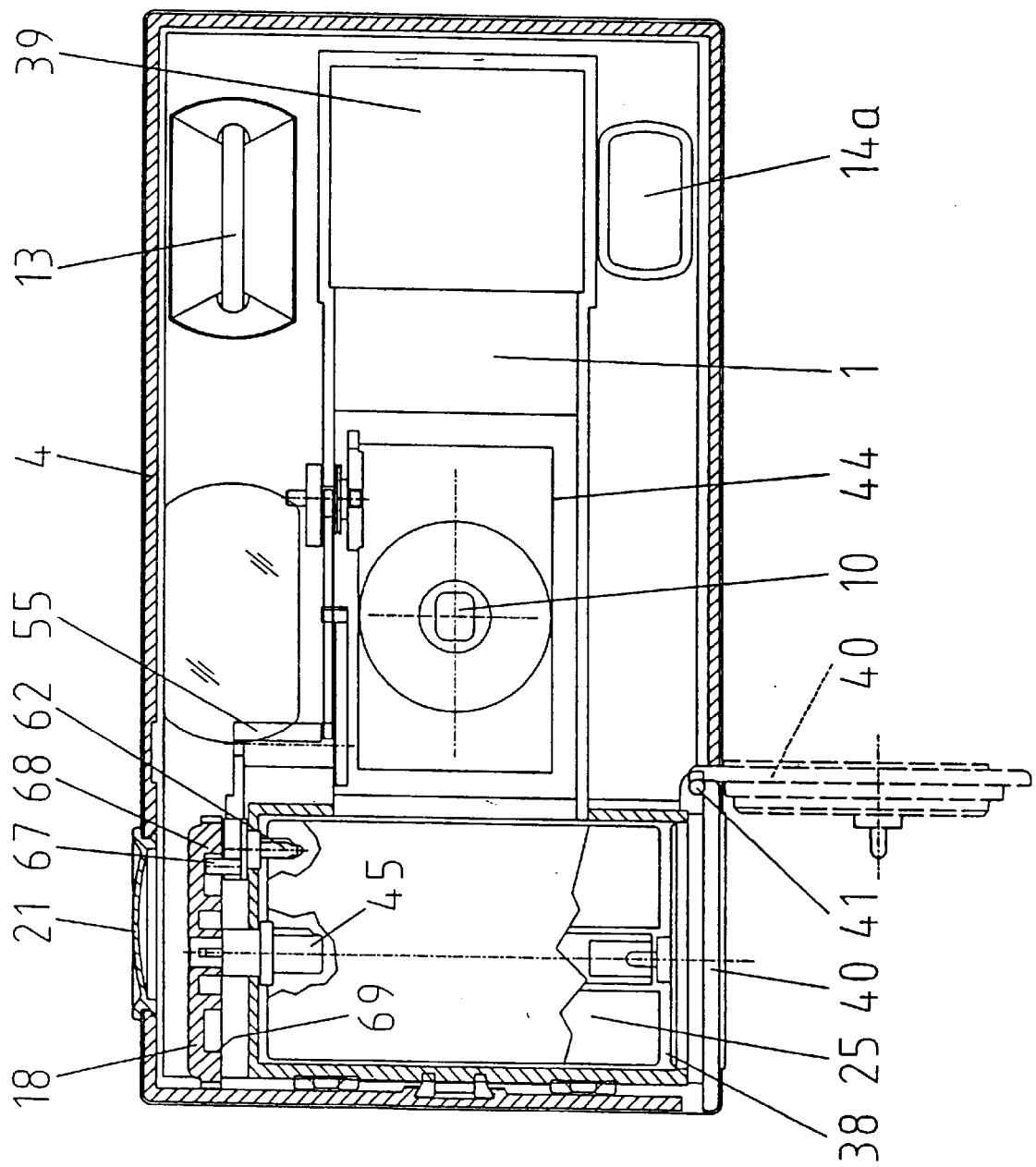
Figure 15:
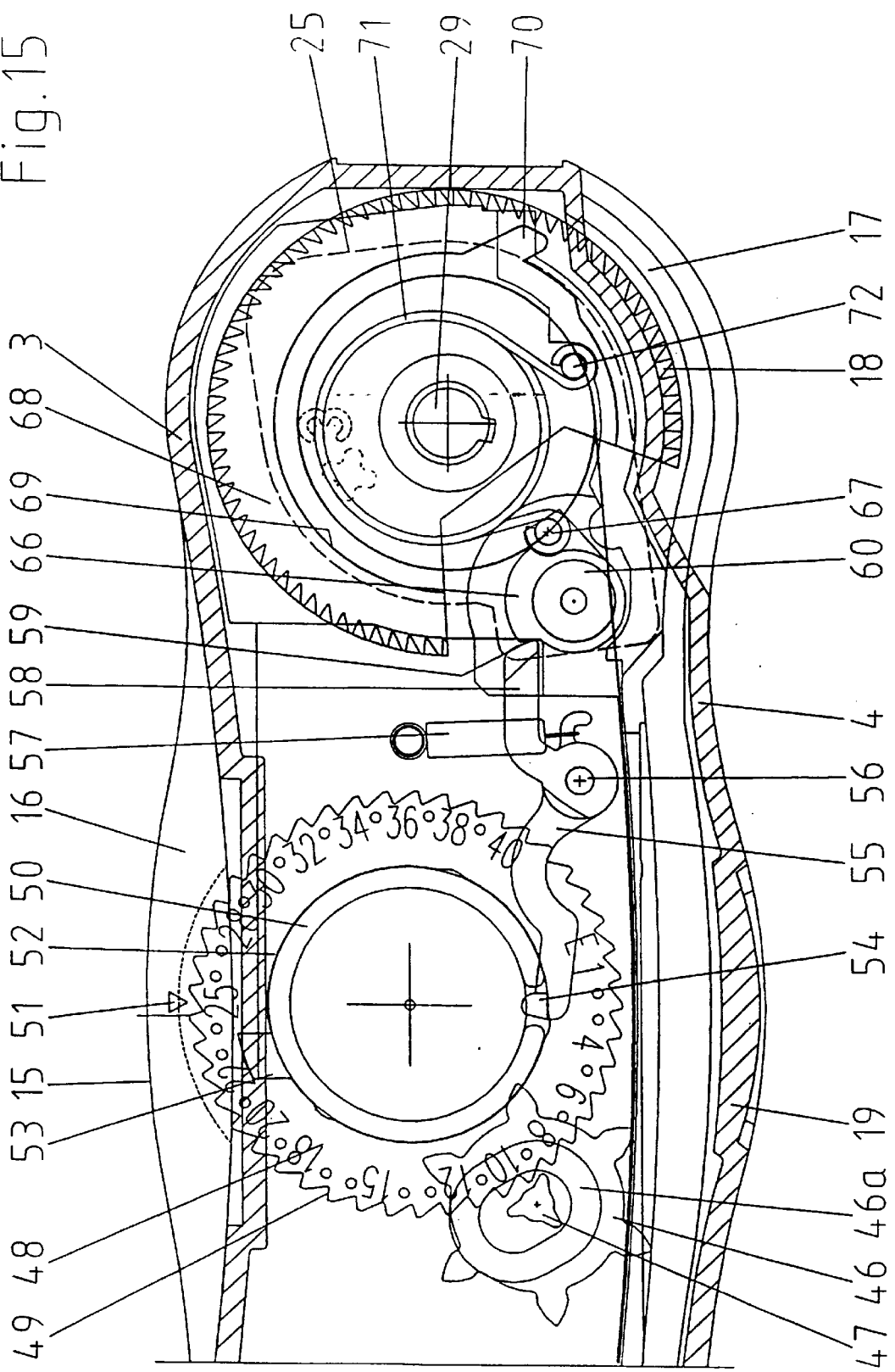
Figure 16:
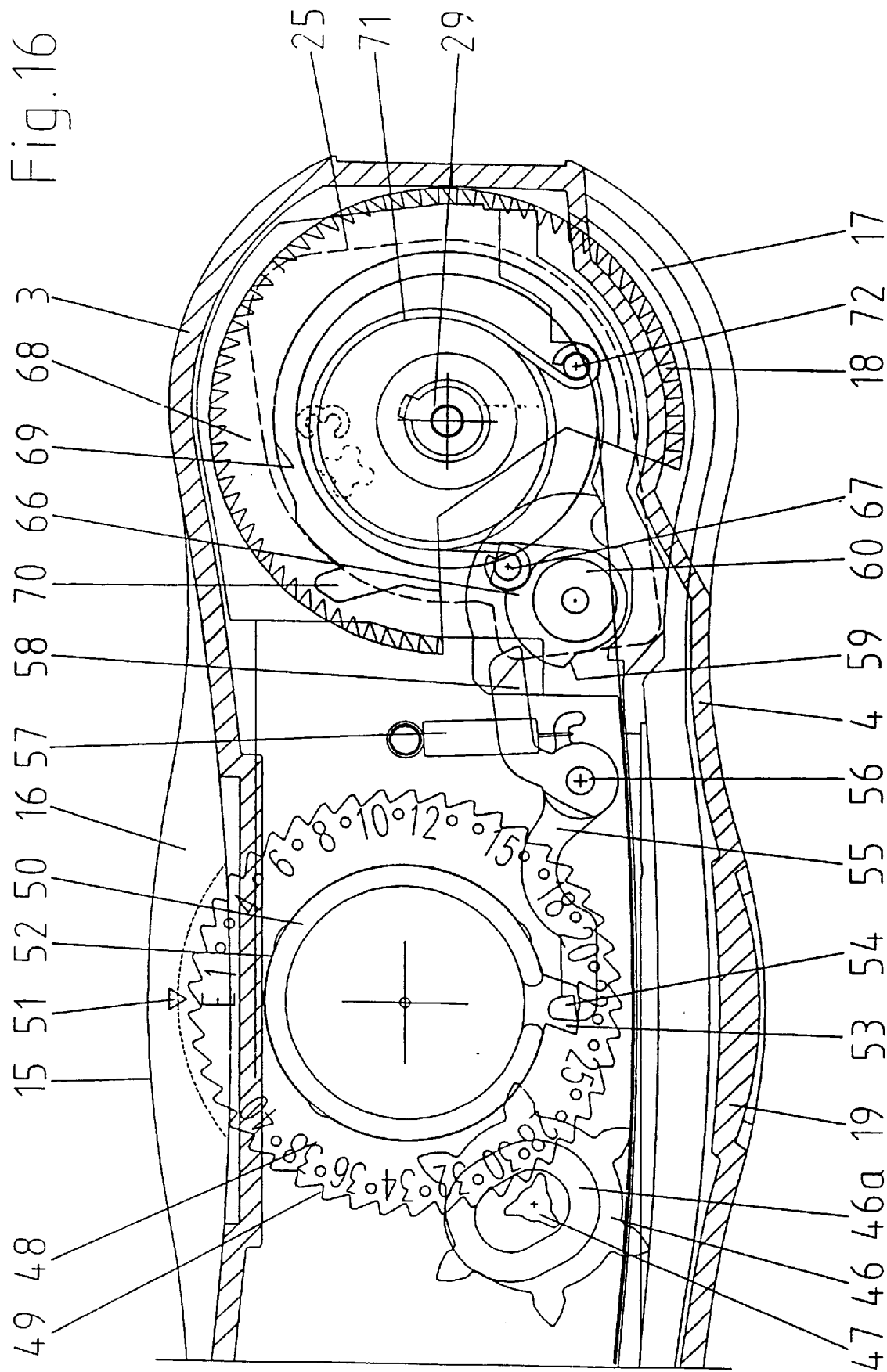
Figure 17:
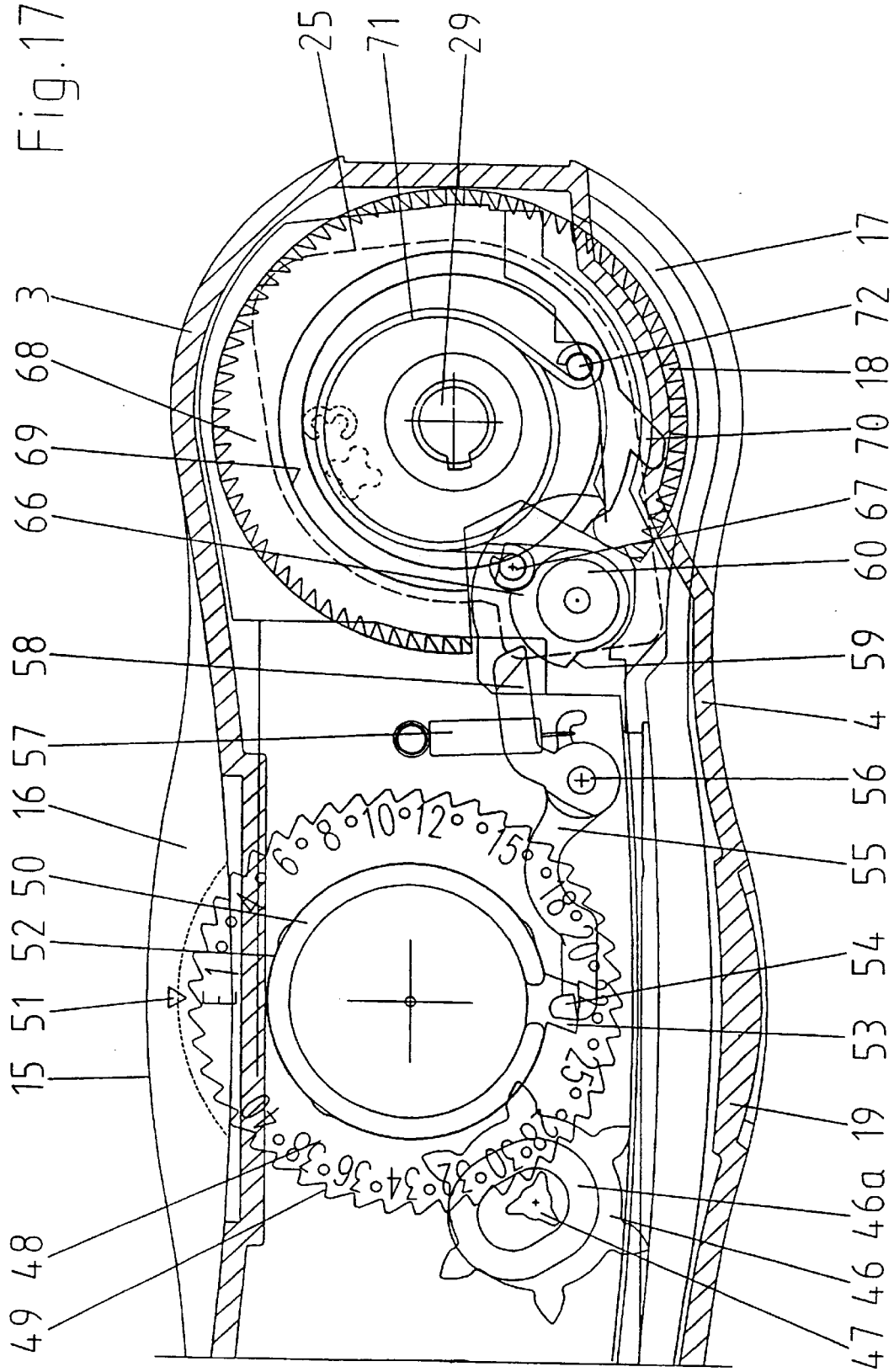
Figure 18:
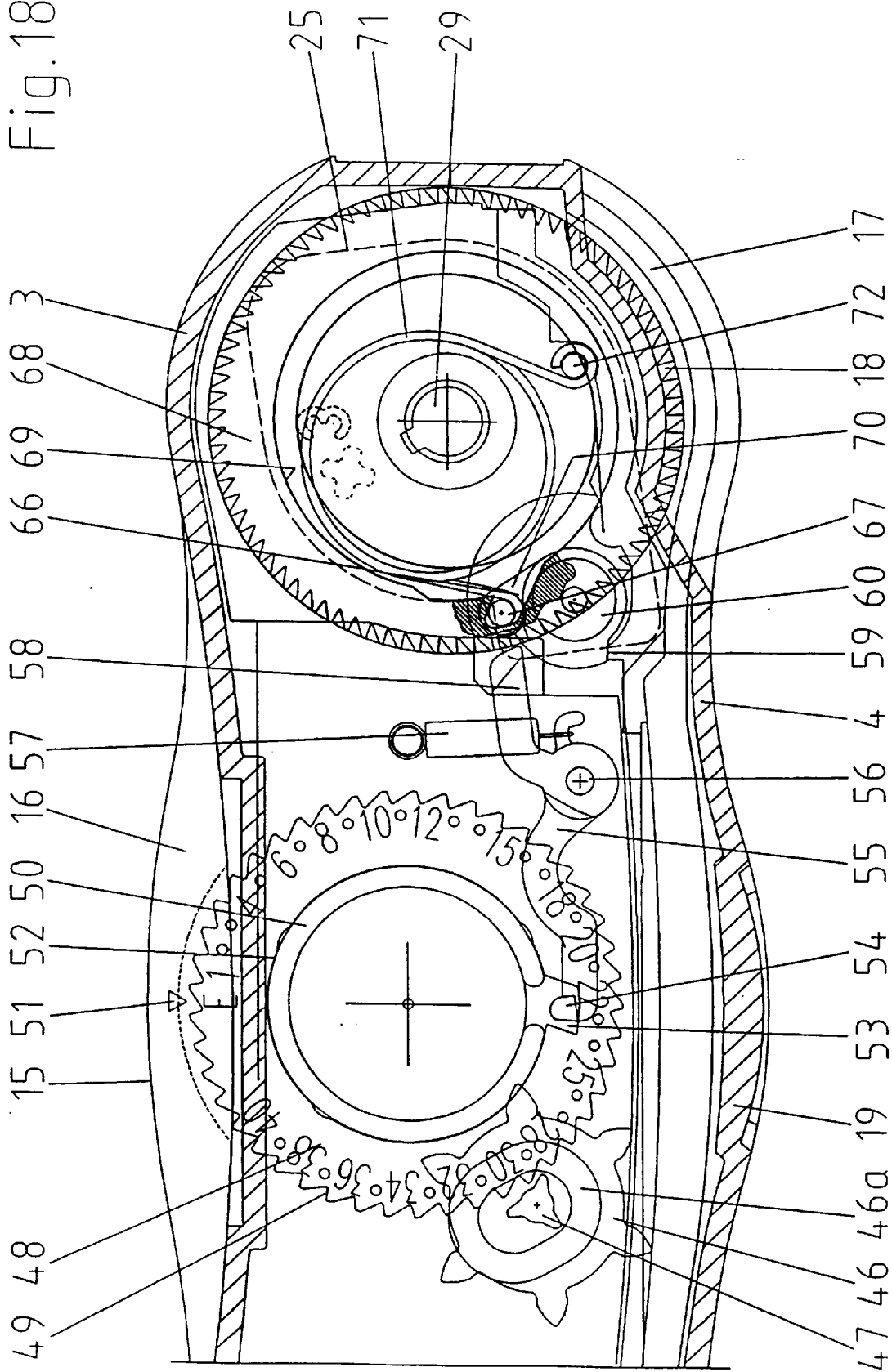

FIG. 14 is a front view showing the internal structure of the camera according to FIGS. 1 to 4 with the front housing shell removed and with a further embodiment of the core module of this camera shown in further detail, FIG. 15 is a view from above of the core module of the camera shown in FIG. 14 with a shift gearing in a first operating position, FIG. 16 shows the subject matter of FIG. 15 with the shift gearing in a second operating position, FIG. 17 shows the subject matter of FIG. 15 with the shift gearing in a third operating position, FIG. 18 shows the subject matter of FIG. 15 with the shift gearing in a fourth operating position, and FIG. 19 is a view from below of a film cassette of the APS system.

The embodiment of the invention illustrated in the drawings is a camera which is fitted by the manufacturers with an APS film and an APS film cassette prior to distribution and in this packaged form is distributed in a user-ready state to the final buyer, who can immediately use the camera for recording a predetermined number of photographic images according to the number of frames provided on the APS film. The user then delivers the entire camera with the exposed film contained therein to a developing station, where the film, after being removed from the camera, is developed and further processed. When the developed film and the copies prepared therefrom are returned to the user of the previously delivered camera, the now empty camera is not returned to the user, but is returned by the developing station, optionally in parts, to the respective camera manufacturer. The parts of the returned camera are examined and if still usable are reused in newly packaged cameras. Unsound camera parts are supplied to a recycling process for reuse. The camera user, on the other hand, can receive a new or reconditioned camera for further or subsequent photographic recordings, the said camera being again fitted with unexposed film by the manufacturers.

When this type of camera is used, the user does not have to bother with inserting the unexposed film in the camera or removing the exposed film from the camera. A camera of this type is therefore also described from the point of view of the user as a "disposable camera" or as a "film pack with lens", since it is primarily a film cassette which is designed for frame-by-frame exposure and frame-by-frame film transportation and is insofar supplemented to form a camera. However, as explained above, the term "disposable camera" does not mean that the camera cannot be reused, at least in part, after return to the manufacturer, in the construction of new cameras of like design.

The external appearance of the embodiment of a camera illustrated in the drawings is shown in FIGS. 1 to 3. As FIG. 4 in particular also shows, this embodiment comprises a housing which is formed by an inner housing constructed as a core module 1 and an outer housing 2, which is composed of extensively rigid, front and rear housing shells 3, 4 of approximately mirror-inverted design and almost entirely encloses the separately manufactured core module 1 on all sides, as is known in principle from DE-A-4 414 854.

The outer housing 2 will firstly be described in further detail below.

In the assembled state, the two housing shells 3, 4, which form the outer housing 2, abut against one another in flush fashion at their circumferential edges 5, 6, with the exception of the areas in which they form recesses, explained in further detail below, for receiving external components of the core module 1. In the assembled state, the two housing shells 3, 4 form between them a flat groove 7, in which a circumferential connecting strip 8 is bonded in order to securely hold the two housing shells 3, 4 together in their assembled state.

The front housing shell 3 comprises a tube 9 for a picture taking lens 10 provided on the core module 1, a focusing lens region 11, a diffusing lens 12 for a flash tube 13 provided on the core module 1 of a built-in electronic flash device and a recess 14 for a switch 14a provided on the core module 1 for charging a flash capacitor (the flash device and the parts belonging thereto on the front housing shell 3 are not illustrated in FIG. 4). Like the rear housing shell 4, the front housing shell 3 comprises an outwardly curved projection 15, which amongst other things forms a stepped surface 16. The rear housing shell 4 comprises a slot-like recess 17 for a manually operated film transportation wheel 18, which can be rotated in a given direction to effect the film transportation described in further detail below and is locked in the opposite direction by a return lock, not illustrated, and a focusing lens region 19. Furthermore, on the upper side of the camera, the two housing shells 3, 4 together form a recess 20 for receiving a trigger 21 provided on the core module 1 for triggering a photographic shutter, not illustrated in further detail, which is provided on the core module 1 for, the frame-by-frame exposure of a photographic film fitted in the camera, as will be described in further detail below.

The housing shells 3, 4 are made of transparent plastics material and are fitted on their guide surfaces with matching inlays 22, 23, 24 made of printed cardboard. These inlays 22, 23, 24 are used on the one hand so that the core module 1, which is constructed as a technical component in black plastics material, is not directly visible to the observer. On the other hand, surfaces of the inlays 22, 23, 24 which are visible through the transparent housing shells 3, 4 are printed with information for the camera user and can be decorated with a chosen design. As shown in FIG. 4, the inlays 22, 23, 24 comprise a series of punched-out sections, not indicated in further detail, in the region of the photographic lens 10 and the elements 11, 19 of the view finder and in the region of operating elements of the core module 1 for external actuation. A further, correspondingly cut-to-shape inlay (not shown) can be provided for the underside.

Before the structure and design of the internal housing of the above camera constructed as a core module 1 is described in further detail, the structure of an APS film cassette 25 which is to be used in the above camera will firstly be described in further detail with the aid of FIGS. 5 to 7.

The APS film cassette 25, which is often referred to as an APS film cartridge, is designed to accommodate strip-like APS roll film 26. Between two end walls 27a, 27b, of which only the end wall 27a is illustrated in FIGS. 5 to 7, the APS film cassette 25 comprises an approximately cylindrical casing 28 and contains a film reel 29, which is merely schematically illustrated and to which one end of the roll film 26 is secured in a manner known per se and not shown in further detail. Constructed on the casing 28 of the film cassette 25 is a radially projecting film mouth 30, which forms a slot-like opening 31 for the passage of the film 26 through the film mouth 30.

Arranged in the interior region of the film mouth 30 is a shaft 32, which is mounted on the end walls 27a, 27b of the film cassette 25 so as to be rotatable with friction and supports a sealing member 33 constructed in the form of a sealing flap. In the closed position illustrated in FIG. 7, axially extending ribs 34, 35 of the sealing member 33 with correspondingly shaped, similarly axially extending recesses 36, 37 on the film mouth 30 form a labyrinth seal in each case, so that no surrounding light can penetrate the interior of the film cassette 25 from outside once the sealing member 33 has adopted the closed position shown in FIG. 7. The sealing member 33 can, of course, only adopt this position when there is no film in the film mouth 30.

Conversely, when the sealing member 33 is in its open position as shown in FIG. 5, the opening 31 of the film mouth 30 is free to such an extent that the film 26 can pass through without being touched or even impeded by the sealing member 33 during its transportation movement.

In an intermediate position illustrated in FIG. 6, the film can still pass through the film mouth 30, but the sealing member 33 rests against the film 26, so that the film glides along the sealing member 33 as an end region is drawn into the film cassette 25. In this respect, the rib 34 of the sealing member 33 can be constructed in such a manner that it only rests against one or both lateral edges of the film 26 in the position according to FIG. 6, so that the central region of the film 26 cannot become scratched in any way by the sealing member 33 during this transportation movement.

The core module 1 forming the internal housing will now be described in further detail. It is schematically illustrated in FIGS. 8 to 13.

The core module 1 forms a lightproof internal housing for accommodating an APS film cassette 25 according to the design shown in FIGS. 5 to 7 and an APS film roll 26, which is connected at one end to the film reel 29 of this film cassette. Furthermore, the core module 1 comprises the picture taking lens 10, view finder elements, so far as these are not formed onto the housing shells 3, 4, and the photographic shutter, not shown, which can be actuated by means of the trigger 21.

As shown in FIG. 8, the core module 1 also comprises a film cassette chamber 38 for accommodating an APS film cassette 25, said chamber being arranged in the right-hand end region viewed in the direction of the object to be photographed, and a film winding chamber 39 for receiving a loose coil of APS film 26, which is not shown in further detail in FIGS. 8 to 13, the said film winding chamber 39 being arranged in the left-hand end region viewed in the direction of the object to be photographed. The film cassette chamber 38 of the core module 1 is sealed relative to the outside by a substantially flat cassette chamber lid 40, which is approximately round corresponding to the cross sectional profile of the film cassette chamber 38 and is pivotably secured to the base of the core module 1 by means of a hinge 41. In FIG. 8, the cassette chamber lid 40 is illustrated in its closed position in continuous lines. In this position, it seals the film cassette chamber 38 of the core module 1 from the outside in a lightproof manner, forming a clamping seat and a labyrinth seal against the surrounding light. In addition, FIG. 8 shows the cassette chamber lid 40 in the open position in broken lines. In this position, the film cassette 25 disposed in the film cassette chamber 38 can be removed from the camera, as will be described in further detail below.

As can be seen in particular in FIG. 3, the cassette camera lid 40 is disposed in a recess 42 formed by the two housing shells 3, 4 at the base of the camera, so that the cassette camera lid 40 is accessible without opening the outer housing 2 formed by the housing shells 3, 4. The flat groove 7 formed by the housing shells also extends over the outer surface of the cassette chamber lid 40, the connecting strip 8 also extending over the cassette chamber lid 40 and additionally sealing same. In order to open the cassette chamber lid 40, the connecting strip 8 is torn open, which is facilitated by notches 43 on the housing shells 3, 4 with the introduction of a tool for tearing open the connecting strip 8.

A first embodiment of the core module 1 will be described in further detail below. This embodiment is illustrated in further detail in FIGS. 8 to 13 and comprises a film transportation device, which is also connected via a per se known double exposure lock (not shown) to the photographic sealing means or to the gearing for the release thereof. The film transportation device comprises the milled, manually actuated film transportation wheel 18, which according to FIG. 2 projects outwards through the slot-like recess 17 in the rear housing shell 4. The film transportation wheel 18 is used for the frame-by-frame transportation of the film 26 from the film winding chamber 39, past an exposure station with an aperture 44 formed in the core module 1, to the film cassette 25. To this end, the film reel 29 of the film cassette 25 disposed in the film cassette chamber 38 is releasably coupled to the film transportation wheel 18 in a manner known per se via a driving plug coupling 45 known per se. In addition, for advancing the film 26 by one frame at a time, the film transportation device comprises a sprocket wheel 46, which engages in a peripheral perforation of the film 26, is rotated about its axle through a constant angle for each frame and is also adjustable with said axle transversely to the film transportation direction.

Also participating in the rotating and transverse movement of the sprocket wheel 46 which takes place per frame is a switching gear 47, which is provided with three switching teeth and is arranged on an extension of the axle of the sprocket wheel 46, which extension is guided outwards in a lightproof manner through a slot 46a of the internal housing formed by the core module 1. The switching gear 47 can engage in an external toothed rim 49 of an image counter disc 48. The latter is rotatably mounted in the core module 1 on an annular axle 50, which extends parallel to the axle of the film reel 29 of a film cassette 25 when said film cassette is inserted in the film cassette chamber 38 of the camera. The image counter disc 48 is arranged on the upper side of the core module 1 outside the lightproof housing thereof and projects into the interior of the outwardly curved projection 15 of the front housing shell 3, so that the image counter disc 48 rests with its part projecting into the projection 15 beneath the stepped surface 16 of the front housing shell 3.

In the vicinity of its outer edge, the image counter disc 48 comprises counter markings "40" to "1" arranged in a concentric circle for the reverse counting of photographic recordings, and an end marking "E". In order to read the counter marking or end marking "E" adjusted in each case by the rotation of the image counter disc 48, an indicator 51 is provided fixed to the housing. The said indicator 51 is visible together with the respective adjusted counter marking through the transparent stepped surface 16 of the front housing shell 3 arranged parallel to the optical axle of the picture taking lens 10. The counter marking which is adjusted indicates the number of photographic recordings which can still be made before the capacity of the film is exhausted. The image counter disc 48 is advanced by the switching gear 47 by one counter marking when the sprocket wheel 46 together with the switching gear 47 effects a rotational and transverse movement during the frame-by-frame film transportation from the winding chamber 39 to the film cassette 25 arranged in the film cassette chamber 38, the rotational and transverse movement corresponding to the movement of the film 26 by one frame.

The adjustment of the sealing member 33 of the film cassette 25 inserted in the film cassette chamber 38 from the open position according to FIG. 5 into the closed position according to FIG. 7 once the film 26 has been fully wound into the film cassette 25 is controlled by the image counter disc 48. To this end, the shift gearing, which is described below, is used. This gearing is provided between the image counter disc 48 and a spring-driven drive device, which is also described in further detail below, for the sealing member 33 provided in the cassette.

The counter disc 48, which in the illustration according to FIGS. 9 to 11 is extended downwards in the axial direction in the manner of a pot, comprises a concentric cylindrical inner guide surface 52 with an approximately radially outwardly pointing extension 53. Resting against this inner guide surface 52 is a rod 54, which in the illustration according to FIGS. 9 to 11 extends upwards parallel to the axle 50 of the counter disc 48. The rod 54 is secured to one arm of a two-arm cranked shift lever 55, which is also rotatably mounted on a fixed axle 56 on the upper side of the core module 1. The shift lever 55 is acted upon by a tension spring 57, which attempts to rotate the shift lever 55 in an anti-clockwise direction about the axle 56 in the illustration according to FIGS. 9 to 11.

The other lever arm of the shift lever 55 forms a locking pawl 58, which cooperates with an abutment 59 of a drive shaft 60, which is releasably coupled to the shaft 32 of the locking member 33 of the film cassette 25 via a drive plug coupling 62 and is acted upon by a loop spring 61, which is secured at one end to the shaft 60, loops around same and is secured at its other end to an abutment fixed to the housing. This loop spring 61 attempts to rotate the drive shaft 60 in an anti-clockwise direction in the illustration according to FIGS. 9 to 11. The drive shaft 60 with its abutment 59 and the loop spring 61 thus form a drive device for the sealing member 33 of the film cassette 25 for transferring the sealing member from its open position according to FIG. 5 into its closed position according to FIG. 7.

The shift gearing formed by the above-described arrangement between the image counter disc 48 of the camera and the sealing member 33 of the film cassette 25 inserted in the film cassette chamber 38 of the camera acts as a control device for controlling the drive device 59, 60, 61 for the sealing member 33 of the film cassette 25 as follows.

If the film 26 inserted in the camera is still in a transportation state to allow for photographic recording and consequently if the image counter disc 48 is in a position for indicating a frame number between "40" and "1", then the shift lever 55 of the above-mentioned shift gearing is in a position according to FIG. 9. The frame number "26" is shown in FIG. 9 purely by way of example. In the position shown in FIG. 9, the locking pawl 58 of the shift lever 55 rests against the abutment 59 of the drive shaft 60, so that the latter is locked against a rotation which the loop spring 61 attempts to effect in an anti-clockwise direction. In this position of the drive shaft 60, the sealing member 33 of the film cassette 25 adopts the open position according to FIG. 5.

Nothing changes in this switching state when the image counter disc 48 is then advanced via the switching gear 47 up to the counter position "1" as further photographic recordings are made and the film 26 is advanced frame-by-frame by manual actuation of the film transportation wheel 18, so that the sealing member 33 of the film cassette 25 remains in the open position illustrated in FIG. 5.

If the film is advanced into the position for effecting the last recording, the image counter disc moves from the counter position "1" into the counter position "E". In this position, the rod 54 of the shift lever 55 drops under the action of the tension spring 57 into the extension 53 on the inner surface 52 of the image counter disc 48. The shift lever 55 thereby rotates in an anti-clock-wise direction, so that the locking pawl 58 releases the abutment 59 of the drive shaft 60, as illustrated in FIG. 10. Consequently, the drive shaft 60 also rotates under the action of its loop spring 61 in an anti-clockwise direction into the intermediate position shown in FIG. 10 and thereby adjusts the sealing member 33 of the film cassette 25 into its intermediate position according to FIG. 6, in which the sealing member 33 comes to rest upon the edge of the film 26, which in this switching state has passed with its trailing end forming a tail out of the region of the aperture 44 of the camera, but has not yet been fully wound into the film cassette 25. As a result of the coupling between the shaft 32 of the cassette and the drive shaft 60 of the camera, the action of the sealing member 33 resting upon the film 26 means that a further rotation of the drive shaft 60 beyond the intermediate position shown in FIG. 10 is impossible in spite of the force generated by the loop spring 61.

Only by way of a further manual actuation of the film transportation wheel 18 is the tail forming the trailing end of the film 26 fully drawn into the film cassette 25, so that the trailing end of the film 26 passes the film mouth 30 of the film cassette 25. This leaves the way free for a further rotation of the sealing member 33 from the intermediate position according to FIG. 6 into the closed position according to FIG. 7, since the loop spring 61 of the drive shaft 60 effects further action and the drive shaft 60 can advance into the end position according to FIG. 11, the full closure of the film mouth 30 of the film cassette 25 being effected by the sealing member 33 via the coupling 62 between the shafts 32 and 60.

In this manner, the control device, which is formed by the elements 49, 50 of the image counter disc 48, the rod 54, the shift lever 55 and the pawl 58, controls the drive device, which is formed by the shaft 60 with the abutment 59 and the loop spring 61, in such a manner that the sealing member 33 of the film cassette 25 remains in the initially adopted open position during the frame-by-frame film transportation for the frame exposure of the film, but passes into an intermediate position for resting against the film 26 when the film tail is transported into the film cassette, and then adopts the closed position once the film trailing end formed by the tail has been drawn into the film cassette 25.

An indicator flag 63 preferably comprising an angle profile is rigidly secured to the drive shaft 60. The indicator flag 63 thus also participates in the above-described rotation of the drive shaft 60 from the initially adopted position according to FIG. 8 via the intermediate position according to FIG. 10 into the end position according to FIG. 11. The indicator flag 63 is secured to the drive shaft 60 in such a manner that it pivots with the rotation of the said drive shaft out of the intermediate position according to FIG. 10 into the end position according to FIG. 11 behind a display window 64 (cf FIG. 12) visible from the rear of the camera and beneath a display window 65 (cf FIG. 13) visible from the upper side of the camera. As a result of the appearance of the indicator flag in the viewing windows 64, 65, the state of complete rewinding of the film 26 into the film cassette 25 and the lightproof closure of the film mouth 30 of the film cassette can be visually recognised. This state can therefore be visually recognised and thus indicated by a display on the outer surfaces of the camera.

In this respect, the display windows 64 and 65 are formed by corresponding punched-out recesses in the cardboard inlays 23 and 24, which are arranged on the inner surfaces of the housing shells 3, 4. On its surfaces which appear in the viewing windows 64, 65, the indicator flag 63 is provided with colouring which strongly contrasts with the colouring of the cardboard inlays 23, 24 in the area surrounding the above viewing windows 64, 65, so that the visual impact of the display through the transparent housing shells 3, 4 is further increased.

Of course, it is sufficient to provide only one of the two display windows instead of the two display windows 64 and 65.

As soon as the state of full winding of the film 26 into the film cassette 25 and the lightproof closure of the film mouth 30 of the film cassette 25 has been indicated in the display windows 64 and/or 65 in the manner described above, the cassette chamber lid 40 of the delivered camera can be opened without hesitation in the developing station entrusted with the film development and further processing so that the film cassette 25 can be removed from the film cassette chamber 38, without the danger of undesirable light penetration into the film cassette 25. During the subsequent removal of the film cassette 25 from the film cassette chamber 38 of the camera, both the film reel 29 and the shaft 32 of the sealing member 33 are uncoupled from the film transportation wheel 18 or from the drive shaft 60 of the camera by a simple removal of the respective coupling elements of the driving plug couplings 45, 62 fixed to the camera, the sealing member 33 of the film cassette 25 remaining in the illustrated closed position shown in FIG. 7 as a result of a relatively high degree of friction between the shaft 32 and the end faces 27a, 27b of the film cassette 25.

If a delivered camera does not exhibit the above-described display state, as a result of the fact that the user has not exposed the film as far as the last possible frame prior to delivering the film to the developing station, or has not transported the film until the trailing film end is fully drawn into the film cassette 25, this state can be easily recognised in the developing station entrusted with the film development by a visual inspection of the display in the display window 64 and/or 65. The full winding of the film 26 into the film cassette 25 and therefore achievement of a corresponding display state can still be effected by the personnel of the developing station before the film cassette 25 is removed from the camera by opening the cassette chamber lid 40.

In a very simple manner, the control device described above therefore allows for film transportation, which can be effected very easily, at least as far as the transportation state in which the tail of the film 26 has passed the aperture 44 of the camera, and reliably prevents scratching of the film, since the sealing member 33 does not rest upon the film 26 before this transportation state has been reached, so that undesirable friction between the film 26 and the sealing member 33 is prevented. Furthermore, a reliable and visually easily distinguishable display of the state in which the film cassette 25 can be safely removed from the camera is achieved in a simple manner. The simple construction of the above-described control device and display device, which also allows for simple assembly, particularly fulfils the attempt to design so-called disposable cameras of the above type in a cost-effective and nevertheless operationally reliable manner.

Instead of the indicator flag 63 and the display windows 64 and/or 65, the described display device can comprise, for example, an electrical display using signal lights or the like, to which end a switch can be provided for connecting the signal light to a current supply.

A further embodiment of the core module 1 is described in the following, which is designed for controlling a lock for the film transportation device by means of the control device in such a manner that the film transportation device can be blocked or locked against further actuation when the sealing member 33 is transferred to the closed position shown in FIG. 7 once the tail of the film has been fully drawn into the film cassette 25 inserted in the camera.

This further embodiment is illustrated in detail in FIGS. 14 to 18 of the drawings. This further embodiment corresponds extensively to the first embodiment according to FIGS. 8 to 11 described in detail above. Consequently, parts in FIGS. 14 to 18 which have substantially the same structure or function as corresponding parts in FIGS. 8 to 11 are provided with the same reference numerals. The above description of the structure and method of operation of the first embodiment according to FIGS. 8 to 11 therefore applies in a similar manner for the structure and method of operation of the further embodiment according to FIGS. 14 to 18 in so far as the above correlation applies. In this respect, the structure of the further embodiment according to FIGS. 14 to 18 is therefore not repeated in detail.

In the case of the embodiment according to FIGS. 14 to 18, a locking rod 67 is secured to an upper plate 66 of the drive shaft 60 for the sealing member 33 of the film cassette 25 in such a manner that said locking rod 67 is eccentric to the rotational axis of the shaft 60 and projects upwards parallel to the rotational axis of the shaft 60 in the illustration according to FIG. 14. With its free, upper end, the locking rod 67 lies opposite an inner guide surface 69 of a collar-shaped guide rim 68, which is arranged on a lower surface of the film transportation wheel 18 coaxial to the rotational axis thereof and projects downwards in the illustration according to FIG. 14. An elongate locking groove 70, which forms a recess in the guide surface 69, extends from the inner guide surface 69 of the guide rim 68. This locking groove 70 is substantially radially outwardly directed and has a width which is slightly greater than the diameter of the locking rod 67.

The longitudinal axis of the locking groove 70 preferably forms an angle of approx. 45° with the adjoining area of the guide surface 69 of the guide rim 68 and points downwards at an angle relative to the circumferential direction of the film transportation wheel 18.

In the vicinity of its base, the locking rod 67 receives an eyelet, which is formed at one end of an Ω-spring 71 extending approximately concentric to the rotational axis of the film transportation wheel 18. At its other end, the Ω-spring 71 is mounted with a further eyelet on a rod 72, which is arranged fixed to the housing on the core module 1 in a manner not illustrated in further detail.

The Ω-spring 71 is prestressed similar to the loop spring 61 of the first embodiment according to FIGS. 8 to 11 in such a manner that it attempts to pull the locking rod 67 upwards and to the left in the plane of the drawing according to FIG.

15 and thereby to rotate the drive shaft 60 for the sealing member 33 of the film cassette 25 in an anti-clockwise direction, so that the sealing member 33 of the film cassette is transferred into its closed position according to FIG. 7.

The method of operation of the embodiment according to FIGS. 14 to 18 is as follows:

So long as the film 26 inserted in the camera adopts a transportation state according to FIG. 15, in which it is still located with a section in the aperture 44 of the camera and the image counter disc 48 displays a frame number between 40 and 1, the Ω-spring 71 cannot effect a rotation of the shaft 60, since its abutment 59 rests against the locking pawl 58 of the shift lever 55. The locking rod 67 therefore remains in its position illustrated in FIG. 15, in which it lies with its free upper end opposite the guide surface 69 of the guide rim 68, without resting against said guide surface 69.

When the film is advanced into the position for taking the final recording, the image counter disc 48 travels from the counter position "1" into the counter position "E". In this position, the switching rod 54 of the shift lever 55 drops under the action of the tension spring 57 into the extension 53 on the guide surface 52 of the image counter disc 48. The shift lever 5 thereby rotates in an anti-clockwise direction, so that the locking pawl 58 releases the abutment 59 of the drive shaft 60, as illustrated in FIG. 16. As a result, the drive shaft 60 also rotates under the action of its Ω-spring 71 in an anti-clockwise direction into the intermediate position shown in FIG. 16 and thereby adjusts the sealing member 33 of the film cassette 25 into the intermediate position according to FIG. 6, in which the sealing member 33 comes to rest against the edge of the film 26.

Whilst the trailing end forming a tail of the film 26 has passed out of the region of the aperture 44 of the camera in this switching state, it has not been fully wound into the film cassette 25. The action of the sealing member 33 resting against the film 26 acts via the coupling between the shaft 32 in the cassette and the drive shaft 60 in the camera upon the drive shaft 60 in such a manner that a further rotation of the drive shaft 60 beyond the intermediate position shown in FIG. 16 is impossible in spite of the force exerted by the Ω-spring 71. Also in this intermediate position of the drive shaft 60, the locking rod 67 does come to rest upon the guide surface 69 of the guide rim 68 of the film transportation wheel 18. However, as a result of the fact that the sealing member 33 rests against the edge of the film 26, the freedom of movement of the locking rod 67 is restricted in such a manner that it cannot drop effectively into the locking groove 70 when the locking groove 70 travels into the region of the locking rod 67 with the further rotation of the film transportation wheel 18.

When the manual actuation of the film transportation wheel 18 is continued, the tail forming the trailing end of the film 26 is fully drawn into the film cassette 25, so that the trailing end of the film 26 passes the film mouth 30 of the film cassette 25. In this manner, the film transportation state according to FIG. 17 is attained.

The path is now free of film for a further rotation of the sealing member 33 from the intermediate position according to FIG. 6 into the closed position according to FIG. 7. In actual fact however, the sealing member 33 cannot yet pass into the closed position according to FIG. 7, since the locking rod 67 is still resting upon the guide surface 69 of the guide rim 68, so that the drive shaft 60 is still prevented from effecting a further rotational movement in an anti-clockwise direction.

With the further manual rotation of the film transportation wheel 18 in the same direction of rotation, the guide surface 69 of the guide rim 68 slides along the locking rod 67, which rests against the guide surface 69 under the action of the Ω-spring 71, until the locking groove 70 enters the region of the locking rod 67 and the latter drops into the locking groove 70 under the action of the Ω-spring 71, as shown in FIG. 18 and illustrated by the hatched locking groove region. In this manner, as a result of the coupling 62 between the shafts 32 and 60, the full closure of the film mouth 30 of the film cassette 25 is effected by the sealing member 33.

As a result of the above-described inclined position of the locking groove 70, the locking rod 67 is guided along an inclined flank of said locking groove, a force being exerted by said flank upon the locking rod 67 with the continuing actuation of the film transportation wheel 18, said force being transmitted via the drive shaft 60 to the sealing member 33, which is thereby forced with its ribs 34, 35 into the recesses 36, 37 in the film mouth 30 of the film cassette 25. In this phase, the Ω-spring 71 is therefore supported in its action upon the locking rod 67 by the force exerted by the locking groove 70 upon the locking rod 67 during the continued actuation of the film transportation wheel 18. If the Ω-spring 71 is already fully relaxed in this switching state, the rotation of the drive shaft 60 for the closure of the sealing member 33 of the film cassette 25 is effected solely by the inclined locking groove 70, so long as the user exerts an actuating force upon the film transportation wheel 18.

Once the sealing member 33 of the film cassette 25 has reached the final closed position (FIG. 7), the film transportation wheel 18 is blocked or locked against any possible further rotation in the film transportation direction on the part of the user, so that it cannot be further actuated by the user of the camera. The return lock, not shown, of the film transportation wheel 18 prevents unintentional rotation of the latter in the opposite direction.

In the embodiment according to FIGS. 14 to 18, the situation is then such that the drive shaft 60 acts as a drive device for the sealing member 33 of the film cassette 25 and in this respect can be moved between a first position corresponding to the open position of the sealing member 33 of the film cassette 25 and a further position corresponding to the closed position of said sealing member 33. The locking device can be transferred from an inoperative state into an operative state and in this respect is connected with the drive device 60 in such a manner that the locking device, which is formed by the locking rod 67 as a first locking member and by the locking groove 70 as a second locking member, adopts its operative state when the drive device adopts its above-mentioned second position. In this respect, the locking rod 67 is connected as the first locking member of the locking device to the shaft 60 of the drive device and the locking groove 70 is connected as the second locking member of the locking device to the film transportation device. The locking rod 67 as the first locking member is arranged on the shaft 60 of the drive device parallel and eccentric to the axis of rotation thereof, whilst the locking groove 70 as the second locking member is arranged on the film transportation wheel 18 of the film transportation device. When it is transferred into its operative state, the locking device exerts a drive force upon the drive device for the sealing member 33 of the film cassette 25.

The blocking or locking of the film transportation wheel 18 in the position according to FIG. 18 is maintained until the film cassette 25 with the exposed film 26 fully wound therein is removed from the camera after opening the cassette chamber lid 40.

A subsequent unblocking or unlocking of the film transportation wheel 18 is effected in such a manner that, after the removal of the film cassette 25 with the exposed film 26 from the camera and the subsequent insertion of a new film cassette with unexposed film into the camera, the sealing member 33 of the newly inserted film cassette is transferred, either by means of a tool at the manufacturers or by means of a mechanism provided in the camera and not illustrated, from an initial closed position into an open position according to FIG. 5, the drive shaft 60 of the camera being rotated to such a degree that the locking rod 67 again leaves the locking groove 70 of the guide rim 68 of the film transportation wheel 18, so that the Ω-spring 71 is again tensioned. Subsequently, the image counter disc 48 is transferred in a manner not shown in further detail into a starting position, the shift rod 54 of the shift lever 55 leaving the extension 53 and the shift lever 55 being rotated in an anti-clockwise direction, so that the shaft 60 again moves into the position according to FIG. 15 and is held in this position by the pawl 58 of the shift lever 55.

The locking device illustrated in FIGS. 14 to 18 can also be modified, for example, in such a manner that a first locking member of the locking device is connected to the shaft 60 or another part of the drive device for the adjustment of the sealing member 33 and a second locking member of the locking device is provided on a locking pawl for the film transportation device.

In an embodiment which is described in the following but not shown in the drawings, a spring-loaded locking pawl, which is rotatable about an axle, can preferably be provided, which after each triggering of a frame-by-frame exposure releases the film transportation wheel 18 and, at the end of each advance of the film by one frame effected by manual actuation of the film transportation wheel 18, drops with a pawl arm into the toothing of the film transportation wheel 18 and thereby locks the film transportation until the following photographic recording is made. The film transportation wheel 18 is then released again by the locking pawl and the above-described procedure is repeated, until the image counter disc 48 reaches the "E" position.

A locking surface forming the second locking member of the locking device can be provided on the above-mentioned locking pawl and can be arranged in such a manner that the locking rod 67 does not come to rest upon said locking surface, so long as the locking rod 67 adopts the position according to FIG. 15. Only when the locking rod 67 moves into the position according to FIGS. 16 or 17 after the last photographic recording has been made in the manner described in respect of the embodiment according to FIGS. 14 to 18, does the locking rod 67 come to rest upon the above-mentioned locking surface of the locking pawl, so that the locking pawl is prevented from dropping with its locking arm into the toothing of the film transportation wheel 18, even when, during the feeling of a film hole pair arranged at the front frame edge of the respective frame of the film perforation of an APS film inserted in the camera by the film measuring device, not shown, a further film hole pair follows at the end of the final exposure frame of the film and could also be felt by the film measuring device. Even in this case, the further transportation of the film is possible, until the tail of the film is fully wound into the film cassette and the operating phase has been reached in which the locking rod 67 adopts the position according to FIG. 18. The locking surface of the locking pawl is constructed in such a manner that it releases the locking rod 67 again into its position according to FIG. 18, so that the locking pawl can then drop under the action of its spring with the pawl arm into the toothing of the film transportation wheel 18. The film transportation wheel 18 is then also locked against further actuation in the case of the last-described embodiment. A subsequent unlocking is effected in the same manner as in the embodiment illustrated in FIGS. 14 to 18.

Instead of the locking device provided in FIGS. 14 to 18 with the locking rod 67 arranged eccentrically on the shaft 60 and the locking groove 70 arranged on the film transportation wheel 18 or with the locking surface arranged on an alternatively provided locking pawl, a locking device of a different design can be provided, for example a locking device formed by a pawl gearing (not shown).

The proposed locking device for locking the film transportation against further actuation once the film has been fully wound into the film cassette and once the sealing member 33 of the film cassette has been transferred into the closed position according to FIG. 7, can also be provided in principle when, instead of the film transportation wheel 18, a rapid shift lever known per se or a film transportation device known per se driven by an electric motor are provided as actuating means for film transportation.

The locking of the film transportation wheel 18 after the complete winding of the film tail into the film cassette 25 according to the embodiment of FIGS. 14 to 18 simultaneously forms a display for this film transportation state. This state is externally visible to the user when he attempts a further manual actuation of the locked film transportation wheel 18. In the embodiment according to FIGS. 14 to 18 it is therefore possible to dispense with a display device with an indicator flag 63 and a display window 64 and/or 65 in the housing, as can be provided in the embodiment according to FIGS. 8 to 13. However, it is also possible to additionally provide a display device of this type with an indicator flag 63 and display window 64 and/or 65 or a different display device in the embodiment according to FIGS. 14 to 18 (not shown in FIGS. 14 to 18).

The Ω-spring 71 provided in the embodiment according to FIGS. 14 to 18 for driving the shaft 60 can, in principle, also be provided in the first embodiment according to FIGS. 8 to 11 and the loop spring used in this case, like the Ω-spring 71 in the embodiment according to FIGS. 14 to 18, can be replaced by a loop spring similar to the loop spring 61. In both embodiments, a different spring, e.g. a tension spring can be provided instead of a loop spring 61 or a Ω-spring 71, with a correspondingly adapted mount or suspension from the shaft 60 or housing, in order to rotate the shaft 60 in an anti-clockwise direction.

As a variation of the embodiments according to FIGS. 8 to 11 and/or FIGS. 14 to 18, it is also possible to provide a drive connection between the drive shaft 60 and the film transportation wheel 18 in such a manner that, during the actuation of the film transportation wheel 18, the shaft 60 is imparted with a torque by said wheel over the entire switching path of the shaft 60 or even over only a part of this switching path. This is partially the case anyway in the embodiment according to FIGS. 14 to 18 during the transition from the switching state according to FIG. 17 into the switching state according to FIG. 18, as already explained. In the modified embodiments, a drive connection can be effected between the film transportation wheel 18 or a different film transportation device and the shaft 60, for example by a gearing with a slip clutch or a pawl gearing. In this case, the loop spring 61 or Ω-spring 71 or other spring for driving the shaft 60 for transferring the sealing member 33 into the closed position illustrated in FIG. 7 can be optionally dispensed with.

As a further, although more complex, possibility of modifying the above-described solutions, a spring can be provided in the film cassette 25 for driving the shaft 60 (also not shown in the drawings). Also in this case, it is possible to dispense with a loop spring 61 according to FIGS. 8 to 11 or a Ω-spring 71 according to FIGS. 14 to 18 or a different spring in the core module 1 for driving the shaft 60 for the transfer of the sealing member 33 into the closed position shown in FIG. 7.

The control device described in detail above and contained in the embodiments according to FIGS. 7 to 13 and 14 to 19 can also be modified in such a manner that the control is not derived from the feeling of a control surface of the image counter disc 48, but for example by the feeling of the film by a feeler, which can be provided (although not shown) in the inner housing of the core module 1 on the film transportation path between the aperture 44 and the film cassette chamber 38. However, in this case it is then necessary to provide an additional gearing element, which extends from the lightproof inner housing to the drive shaft 60 of the drive device for the locking member 33 of the film cassette 25.

Apart from providing the blocking or locking of the film transportation wheel 18 in the switching state according to FIG. 18, the locking device according to FIGS. 14 to 18 also offers the advantage that a display state device on the film cassette 25 can also be controlled by means of the film transportation wheel 18 for the visual display of a "film exposed" state, as will be described in further detail below. To this end, reference is made to FIG. 19, where a film cassette of the APS type is shown in a view from below, in which the film cassette is rotated through 180° relative to the illustration in FIGS. 15 to 18.

As shown in FIG. 19, the APS film cassette comprises on its end wall 27a four differently shaped markings 73, 74, 75, 76 constructed as cut-away sections. In this respect, the marking 75 is used for the visual display of a state in which the film contained in the film cassette has been exposed frame-by-frame and has no more free capacity for the photographic recording of further images.

The markings 73 to 76 can be approached in turn by a marker segment 77 having a contrasting colour, which marker segment is rigidly secured to the film reel 29 of the film cassette and is arranged between the above-mentioned end wall 27a and an intermediate base, not shown, of the cassette which shields the actual film chamber of the film cassette in a lightproof manner relative to the light-permeable markings 73 to 76. When the film reel 29 of the film cassette 25 is rotated via the driving coupling 45 as a result of the rotation of the film transportation wheel 18, the marker segment 77 in the film cassette also rotates in a corresponding manner and thereby travels beneath the cut-away sections of the end wall 27a forming the markings 73 to 76 in turn, so that these markings are externally recognisable in turn to the observer by the contrasting colour of the marker segment 77. In this manner, the observer is provided with a visual signal of the operational state of the film cassette associated with the respective marking. For example, if the marker segment 77 is located beneath the cut-away section forming the marking 75, then the observer recognises that the film cassette is in the "film exposed" state, so that he can assume that the film contained in this film cassette has been fully exposed and needs to be supplied to a film developing process. In this respect, the driving coupling 45 is constructed in such a manner that, when the coupling between the axle of the film transportation wheel 18 of the camera and the film reel 29 of the film cassette 25 inserted in the camera is active, an exact and clear angular relationship exists between the film transportation wheel 18 of the camera and its locking groove 70 on the one hand and the film reel 29 in the cassette and the marker segment 77 on the other hand.

In the embodiment according to FIGS. 14 to 18, it is ensured that the sealing member 33 of a film cassette 25 inserted in the camera is transferred into the closed position precisely at the moment when the film transportation wheel 18 with its locking groove 70 of the guide rim 68 adopts the angular position shown in FIG. 18. This angular position of the film transportation wheel corresponds exactly to the angular position in which the marker segment 77 participating in the rotation of the film reel 29 of the film cassette lies beneath the cut-away section forming the marking 75. As a result of the blocking or locking of the film transportation wheel 18 in the above-mentioned angular position, the marker segment 77 itself retains the position beneath the cut-away section forming the marking 75, so that the resulting visual characterisation of the marking 75 is maintained when the film cassette characterised in this manner is subsequently removed from the camera and the driving coupling 45 is thereby rendered inoperative. If the film cassette is removed from the camera, the observer can see from the visual characterisation of the marking 75 by the corresponding adjustment of the marker segment 77, that the film of this cassette can be considered fully exposed.

The solution contained in the embodiment according to FIGS. 14 to 18 for marking a film cassette according to a specific state is therefore based upon the fact that a rotatable film transportation device of a camera comprises a control element, which with the transfer of the sealing member 33 of a film cassette inserted in the camera adopts a given angular position and transfers this angular position via a film reel coupled to the film transportation device to a marker element of the film cassette provided on the film reel, whilst maintaining the angular relationship. In the embodiment according to FIGS. 14 to 18, these elements and functions are, by way of example, as follows: Rotatable film transportation device formed by film transportation wheel 18, control element of the film transportation device formed by locking groove 70 on the film transportation wheel 18, given angular position of the film transportation device defined by positioning of the locking groove 70 relative to the locking rod 67, transfer of the given angular position of the film transportation device to the marker element (marker segment 77) of the film cassette by driving coupling 45 with clear angular relationship.

A marking of the film cassette 25 in the state prior to removal from the camera by a corresponding adjustment of the marker segment 77 as a display device for indicating an operating state of the film cassette 25 can also be achieved, for example, when only one control marking acting as a control element is provided on the film transportation wheel 18 instead of the locking groove 70 and when only one switching element connected to the shaft 60 is present instead of the locking rod 67, said switching element reacting to the control element on the film transportation wheel 18 and accordingly controlling the closing movement of the sealing member 33 of the film cassette, without the control element on the film transportation wheel 18 and the switching element connected to the shaft 60 forming a locking device for the film transportation.

The control of the marker segment 77 of the film cassette 25 by the film transportation device in association with the drive device for the sealing member 33 of the film cassette can also be effected, instead of by the manually actuated film transportation wheel 18, by a different gear wheel in a gearing chain of the film transportation device. This is particularly an option in cases where the film transportation device has an electric motor drive and is actuated, for example, after the manual actuation of the shutter trigger by an electrical switch controlled by said shutter trigger.

Similarly, the guide rim 68 and the locking groove 70 can be provided, instead of on the manually actuated film transportation wheel 18, on a different gear wheel of a gearing chain of the film transportation device.

The embodiments described above are particularly suitable for cameras of the above-described "disposable" type, i.e. for cameras which are fitted with film by the manufacturers prior to distribution and before reaching the user. However, the shift gearings provided in the above-described embodiments can also be advantageously used in cameras which, in contrast to the above-described embodiments, are intended for conventional use where the insertion and removal of the film cassettes into or from the camera is carried out by the camera user.

What is claimed is:

1. A camera, comprising
   (a) a camera housing;
   (b) a film cassette chamber arranged in the camera housing for receiving a film cassette for strip-like photosensitive film, a film opening in the film cassette closable in a lightproof manner by a sealing member adjustable between an open position enabling passage of the film through the opening, and a closed position;
   (c) drive means arranged in the camera housing for adjusting the sealing member of the film cassette when inserted in the film chamber from the open position to the closed position;
   (d) film transportation means arranged in the camera housing for transporting the film including a film tail fully into the film cassette, following film transportation frame-by-frame for frame-by-frame exposure of the film;
   (e) image counting means for counting images according to frame-by-frame transportation of the film, the image counting means being movable to a predetermined position after counting a given number of images; and
   (f) control means operatively connected to the image counting means and the drive means for controlling the drive means so that the sealing member of the film cassette;
       remains in the open position, without resting against the film, before the counting means reaches the predetermined position;
       rests against the film tail in an intermediate position, after the counting means reaches the predetermined position; and
       adopts the closed position once the film tail has been drawn into the film cassette by the film transportation means.

2. A camera according to claim 1, wherein the drive means comprises a driving spring for moving the sealing member toward the closed position, and is locked against movement, before the image counting means reaches the predetermined position.

3. A camera according to claim 2, wherein the control means is constructed and arranged to release the drive means form being locked when the image counting means has reached the predetermined position.

4. The camera according to claim 1, wherein the image counting means comprises a rotatably mounted disc and a cam engaged by the control means.

5. The camera according to claim 4, wherein the control means comprises gear means having one end engaging the cam of the image counting means and another end engaging the drive means.

6. A camera according to claim 1, wherein the drive means comprises a drive shaft coupled to a shaft on the sealing member of the film cassette by a driving plug coupling.

* * * * *